US005568000A

United States Patent [19]
Hanneken

[11] Patent Number: 5,568,000
[45] Date of Patent: Oct. 22, 1996

[54] MULTIPLE POLE, SHADED POLE SUBFRACTIONAL-HORSEPOWER INDUCTION MOTOR

[75] Inventor: John B. Hanneken, Tempe, Ariz.

[73] Assignee: Dial Manufacturing, Inc., Phoenix, Ariz.

[21] Appl. No.: 311,942

[22] Filed: Sep. 26, 1994

[51] Int. Cl.⁶ .................................................. H02K 1/00
[52] U.S. Cl. ......................................... 310/254; 310/258
[58] Field of Search .................................. 310/182, 183, 310/216, 254, 258, 259

[56] References Cited

U.S. PATENT DOCUMENTS

| | | | |
|---|---|---|---|
| 2,172,191 | 9/1939 | Denman | 171/252 |
| 2,500,191 | 3/1950 | Lee | 318/325 |
| 3,609,427 | 9/1971 | Lautner et al. | 310/258 |
| 3,634,707 | 1/1972 | Tillner et al. | 310/172 |
| 4,045,698 | 8/1977 | Morrill | 310/166 |
| 4,638,201 | 1/1987 | Feigel | 310/216 |
| 5,036,237 | 7/1991 | London | 310/254 |

FOREIGN PATENT DOCUMENTS

| | | | |
|---|---|---|---|
| 0012547 | 1/1983 | Japan | 310/259 |
| 1090996 | 11/1967 | United Kingdom | 310/259 |
| 9308631 | 4/1993 | WIPO | 310/216 |

*Primary Examiner*—Thomas M. Dougherty
*Attorney, Agent, or Firm*—Tod R. Nissle

[57] ABSTRACT

A multiple pole, shaded pole, subfractional-horsepower induction motor includes a two piece stator. Wound wire is mounted on one piece of the stator before final assembly of the stator. Reluctance gaps are utilized to increase the strength of the motor.

8 Claims, 4 Drawing Sheets

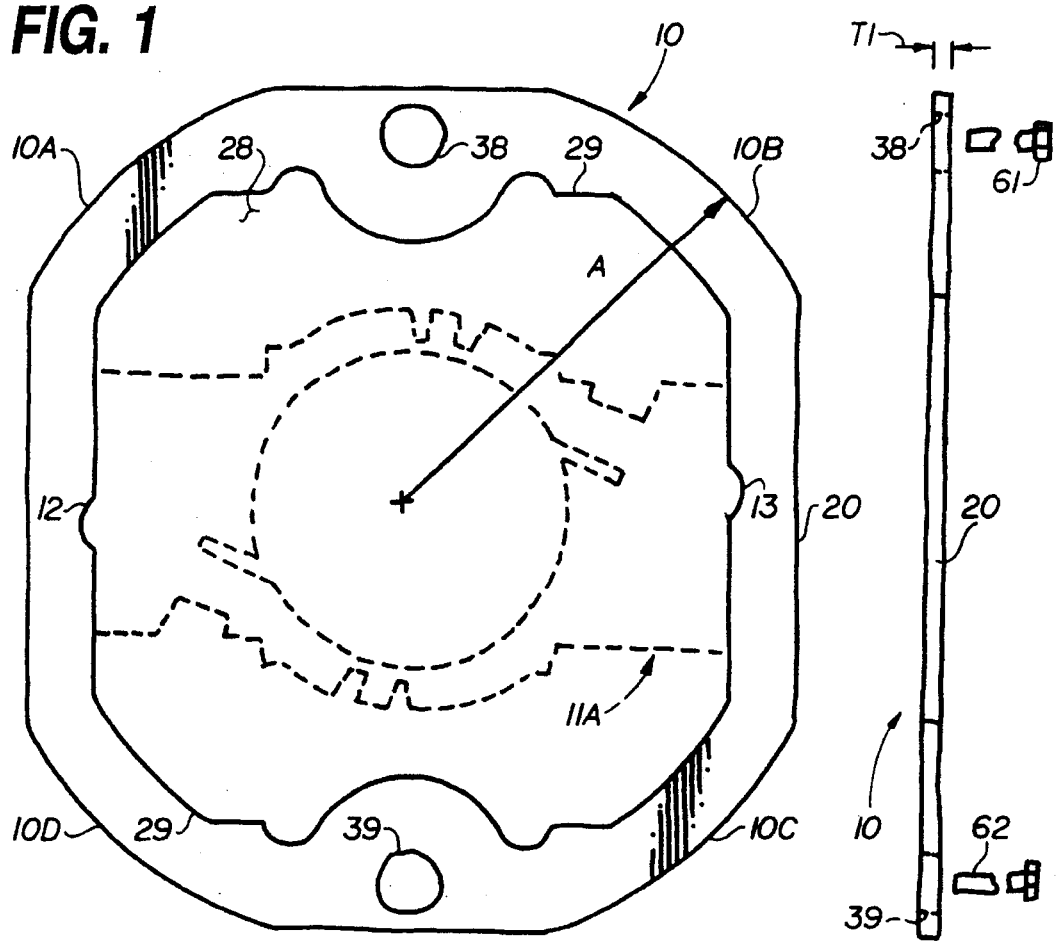
FIG. 1
FIG. 2
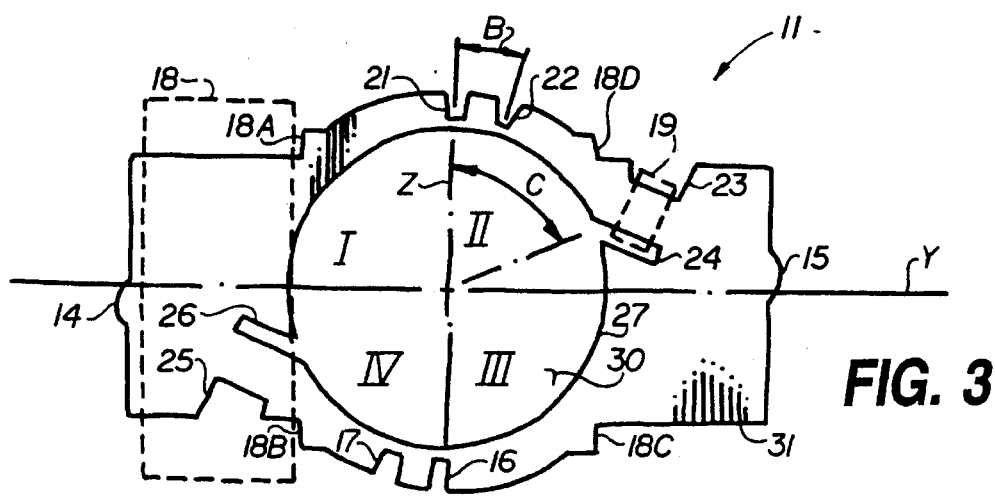
FIG. 3
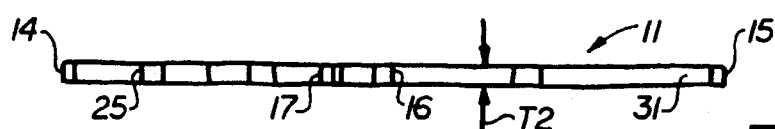
FIG. 4

MULTIPLE POLE, SHADED POLE SUBFRACTIONAL-HORSEPOWER INDUCTION MOTOR

This invention pertains to motors.

More particularly, the invention pertains to concentric, multiple pole, shaded pole, subfractional-horsepower induction motors.

Subfractional-horsepower induction motors have a horse-power (HP) of 1/20 HP or less, typically 1/150 HP to 1/20 HP. Such motors ordinarily include a single piece stator, an armature rotationally mounted in an opening in the stator, two or more primary poles, and two or more "shaded" or secondary poles. A shaded pole or coil is a piece of material than can conduct electricity to create another magnetic field inside the primary magnetic field generated in the motor. The primary magnetic field is generated by wire wrapped around a primary pole. The secondary pole or magnetic field gives the motor its initial direction and rotation when it starts. The secondary pole makes the motor spin by changing the characteristics of the magnetic field in the stator. Subfractional-horsepower motors are used to power water pumps in evaporative coolers and are used in other applications which require a small motor. The design and efficiency of subfractional horsepower induction motors have in large part remained unchanged for many years.

Accordingly, it would be highly desirable to provide an improved subfractional-horsepower induction motor and method for producing the same.

Therefore, it is a principal object of the invention to provide an improved subfractional-horsepower induction motor and method for producing the same.

A further object of the invention is to provide an improved subfractional-horsepower induction motor which permits the mounting of wound wire on the stator before the final assembly of the stator.

Another object of the invention is to provide an improved concentric subfractional-horsepower induction motor which utilizes an armature or rotor which can be interchangeably utilized on a C-frame stator in a subfractional-horsepower induction motor.

Still a further object of the invention is to provide an improved concentric subfractional-horsepower induction motor which utilizes reluctance gaps to force the primary magnetic field into the rotor or armature of the motor to increase the strength of the motor.

Yet another object of the invention is to provide an improved mounting bracket for a subfractional-horsepower induction motor.

These and other, further and more specific objects and advantages of the invention will be apparent to those skilled in the art from the following detailed description thereof, taken in conjunction with the drawings, in which:

FIG. 1 is a top view illustrating a metal lamina utilized to form the outer portion of the stator of the motor of the invention;

FIG. 2 is a side view further illustrating the lamina of FIG. 1;

FIG. 3 is a top view illustrating a metal lamina utilized to form the inner portion of the stator of the motor of the invention;

FIG. 4 is a side view further illustrating the lamina of FIG. 3;

Figure 5:
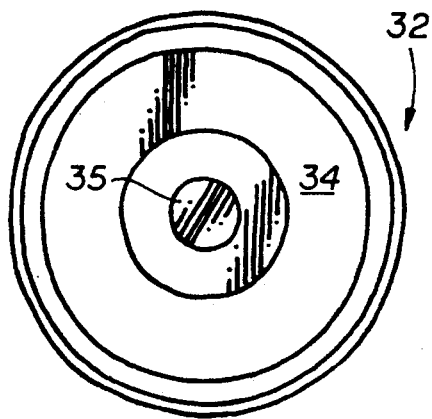
FIG. 5 is a top view illustrating the rotor or armature utilized in the subfractional induction motor of the invention.

Briefly, in accordance with my invention, I provide a method of assembling a concentric shaded pole subfractional horsepower induction motor. The motor includes a stator, at least one field winding, and an armature rotatable in a central opening in the stator about a longitudinal axis of the stator core. The method includes steps of winding wire on at least one bobbin; assembling the outer portion of the stator core by stacking in registration one on top of the other a plurality of laminas each of substantially equal shape and dimension, the outer portion of the stator circumscribing and defining a first inner open space; assembling the inner portion of the stator core by stacking in registration one on top of other a plurality of laminas each of substantially equal shape and dimension, the inner portion of the stator core circumscribing and defining a second inner open space and shaped and dimensioned to receive shaded poles and to receive the bobbin; installing the bobbin and at least a pair of spaced apart shaded poles on the inner portion of the stator core; inserting the inner portion of the stator core in the inner open space in the outer portion; and, inserting an armature in the second inner open space, the armature including a rotatable shaft. A mounting bracket can be attached to the outer portion of the stator core with a bearing intermediate and contacting the armature and the bracket and at least partially circumscribing the rotatable shaft.

In another embodiment of my invention, I provide a concentric shaded multiple-pole subfractional horsepower induction motor including a stator. The stator includes an outer portion including a plurality of registered laminas each of substantially equal shape and dimension stacked one on top of the other. The outer portion circumscribes and defines a first inner open space. The stator also includes an the inner portion including a plurality of registered laminas each of substantially equal shape and dimension stacked one on top of the other. The inner portion of the stator circumscribes and defines a second inner open space. At least a pair of shaded poles are mounted on the inner portion of said stator. At least one bobbin is mounted on the inner portion of the stator. At least two reluctance gaps are formed on the inner portion of the stator. Each reluctance gap is spaced apart from one of the shaded poles along an arc by 90 degrees or less. An armature is rotatably mounted in the second inner open space.

In a further embodiment of my invention, I provide a concentric shaded multiple-pole subfractional horsepower induction motor including a stator. The stator includes an outer portion including a plurality of registered laminas each of substantially equal shape and dimension stacked one on top of the other. The outer portion circumscribes and defines a first inner open space. The stator also includes an inner portion including a plurality of registered laminas each of substantially equal shape and dimension stacked one on top of the other. The inner portion of the stator circumscribes and defines a second inner open space. At least a pair of shaded poles are mounted on the inner portion of said stator. At least one bobbin is mounted on the inner portion of the stator. At least two pair of reluctance gaps are formed on the inner portion of the stator. The reluctance gaps in each of the pairs are being spaced apart along an arc by less than forty degrees. An armature is rotatably mounted in the second inner open space.

In still another embodiment of my invention, I provide a concentric shaded multiple-pole subfractional horsepower induction motor including a stator. The stator includes an outer portion including a plurality of registered laminas each of substantially equal shape and dimension stacked one on top of the other. The outer portion circumscribes and defines a first inner open space and has a selected width. The stator also includes an inner portion including a plurality of registered laminas each of substantially equal shape and dimension stacked one on top of the other. The inner portion of the stator circumscribes and defines a second inner open space. At least a pair of shaded poles are mounted on the inner portion of said stator. At least one bobbin is mounted on the inner portion of the stator. An armature is rotatably mounted in the second inner open space. The armature has a selected diameter. The ratio of the diameter to the width of each of the stator laminations is in the range of 1:2.36 to 1:4.4.

Turning now to the drawings, which depict the presently preferred embodiments of the invention for the purpose of illustrating the practice thereof and not by way of limitation of the scope of the invention, and in which like reference characters identify corresponding elements throughout the several views, FIG. 1 illustrates a steel lamina or plate 10 utilized in the construction of the outer portion of the stator of the motor of the invention. The inner peripheral edge 29 of the lamina 10 circumscribes and bounds an open inner area 28. Cylindrical apertures 38 and 39 are formed through lamina 10. Detents 12 and 13 are formed on the inside of lamina 10. The side view of lamina 10 in FIG. 2 shows the right hand edge 20 of the lamina. The width or diameter of lamina 10 equals twice the distance indicated by arrow A. Arcuate portions 10A, 10B, 10C, and 10D lie on the circumference of a circle having a radius indicated by arrow A. In the presently preferred concentric subfractional-horsepower inductance motor constructed in accordance with the invention, the distance indicated by arrow A is 1.65 inches. The outer portion or outer laminate stack of the stator is formed by stacking a plurality of laminae 10 in conventional fashion in registration one on top of the other such that apertures 38 in each lamina are aligned with apertures 38 in the other stacked laminae and such that apertures 39 in each lamina are aligned with apertures 39 in the other stacked laminae.

FIG. 3 illustrates a steel lamina or plate 11 utilized in the construction of the inner portion of the stator of the motor of the invention. Lamina 11 includes slots pairs 25,26 and 23,24 and includes reluctance gap pairs 21,22 and 16,17. The distance between gaps 21 and 22 (or gaps 16 and 17) along an arc is presently 21 degrees, preferably about 20 to 22 degrees. However, the distance between gaps 21 and 22 (or gaps 16 and 17) indicated by arrows B can be in the range of 10 to 40 degrees depending on the desired construction of the concentric subfractional-horsepower shaded pole inductance motor of the invention. Lamina 11 includes longitudinal axis Y and cylindrical aperture 27 formed therethrough. The inner cylindrical surface of aperture 27 circumscribes and bounds open area 30. Normal axes Y and Z cut circular area 30 into four pie shaped quadrants I, II, III, IV. Reluctance gaps 21,22 and slots 23,24 lie in quadrant II, i.e., both gaps 21,22 are within ninety degrees of slots 23, 24. Consequently, the length of the arc indicated by arrows C is less than ninety degrees. Reluctance gaps 16,17 and slots 25,26 lie in quadrant IV, i.e., both gaps 21, 22 are within ninety degrees of arc of slots 25, 26. Flat planar edges 18A, 18B, 18C, 18D are each of equivalent shape and dimension. Nubs 14 and 15 are formed at opposite ends of lamina 11.

The side view of lamina 11 in FIG. 4 shows the planar flat edge 31 of the lamination. The thickness T1 of lamina 10 equals the thickness T2 of lamina 11.

Figure 8:
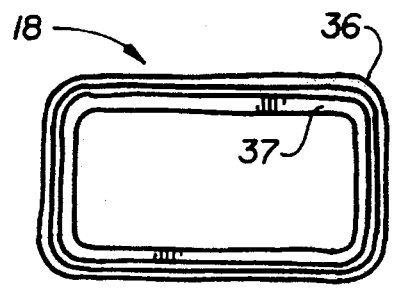
FIG. 8 is a side view illustrating a bobbin utilized on the inner portion of the stator of the motor of the invention to form the primary magnetic field in the motor.
Figure 9:
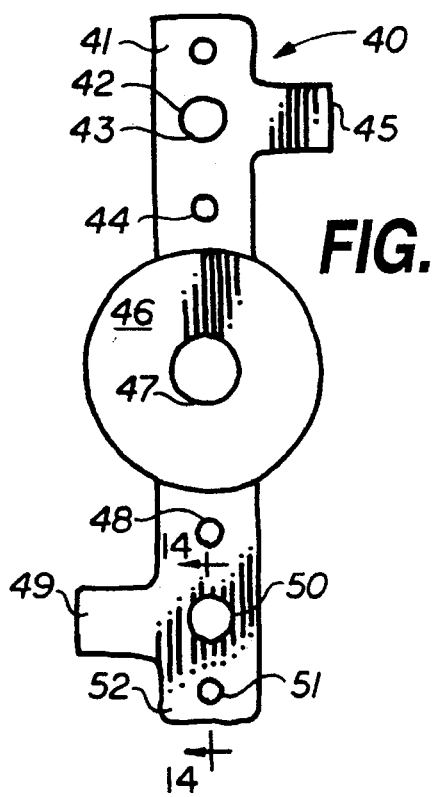
FIG. 9 is a top view illustrating a bracket utilized to mount the motor of FIGS. 1 to 8.

The inner portion of the stator of the motor is formed by stacking a plurality of laminae 11 in conventional fashion in registration one on top of the other such that aperture 27 in each lamina is aligned with the apertures 27 in the other stacked laminae and such that slots 24, 26 in each lamina are aligned with slots 24, 26, respectively, in the other stacked laminae. The number of laminae 11 utilized to make the inner portion of the stator equals the number of laminae 10 utilized to make the outer portion of the stator. After the inner laminae 11 are registered one on top of the other to form an inner laminate stack, a strip of copper 19 (FIG. 3) or other desired material is threaded up through slots 24, over the top of the inner laminate stack, down through aligned slots 23, and over the bottom of the inner laminate stack. Copper strip 19 forms a shaded pole. Another copper strip is similarly threaded through slots 25 and 26 to form a second shaded pole. One bobbin, indicated by dashed lines 18 in FIG. 3, is slid over the left hand end of the inner laminate stack of FIG. 3 to the position shown. Bobbin 18 bears against the flats formed by surfaces 18A and 18B. Another bobbin (not shown) is slid over the right hand end of the inner laminate stack of FIG. 3 and against the flats formed by surfaces 18C and 18D. Each bobbin 18 comprises a rectangular sleeve 37 wound with wire 36 (FIG. 8)

After bobbins and shaded poles have been installed on the inner laminate stack, the stack is positioned in open space 28 inside the outer laminate stack by simultaneously (1) sliding stack nubs 14 through the groove which is on the inside of the outer laminate stack and which is formed by stacked detents 12 and (2) sliding stacked nubs 15 through the groove which is on the inside of the outer laminate stack and which is formed by stacked detents 13. The inner laminate stack is so inserted in the outer laminate stack until the top and bottom surfaces of the inner and outer stacks are coplanar and until each lamina 10 is coplanar with one of the laminae 11 in the inner laminate stack. The coplanar position of each lamina 11 in the inner stack with one of the laminae 10 in the outer stack is illustrated by dashed lines 11A in FIG. 1.

Figure 7:
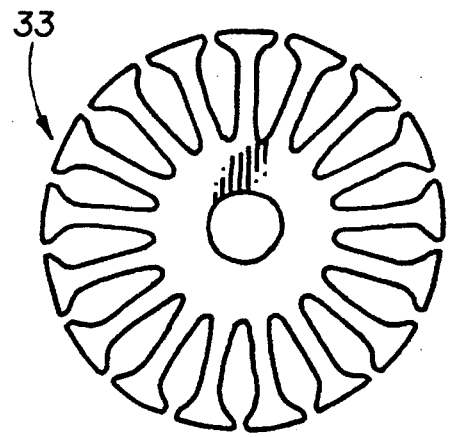
FIG. 7 is a top view illustrating a lamina utilized to construct the rotor of FIGS. 5 and 6.

After the inner and outer laminate stacks are pressed together in the manner described above, a rotor 32 is inserted in inside the inner laminate stack. The rotor 32 includes top surface 34 and shaft 35 having a longitudinal axis which is perpendicular to axes Y and Z and which is collinear with the center line of the cylindrical opening in the inner laminate stack which is formed by the registered openings 27 in the inner laminate stack. FIG. 7 illustrates a circular lamina 33 utilized in fabricating rotor or armature 32. When the diameter of lamina 10 is about 3.3 inches, the diameter of each lamina 33 is typically about one and a half inches. In the invention, the diameter of each lamina 33 has been reduced such that the ratio of the diameter of lamina 33 to the diameter or width of lamina 10 is in the range of 1:2.2 to 1:4.4. Reducing the size of the rotor enables the amount of metal in the stator to be increased so that the magnetic saturation point is not reached as quickly as when the stator has less mass. Further, reducing the diameter of the rotor facilitates using the rotor in a C-frame subfractional-horsepower shaded pole induction motor of comparable or smaller size to the concentric motor illustrated in FIGS. 1 to 8. By way of example, when the diameter of lamina 10 is 3.3 inches, the diameter of lamina 33 (and of rotor 32) is preferably in the range of 0.75 to 1.4 inches and is preferably, but not necessarily, less than the conventional diameter of one and a half inches.

Figure 6:
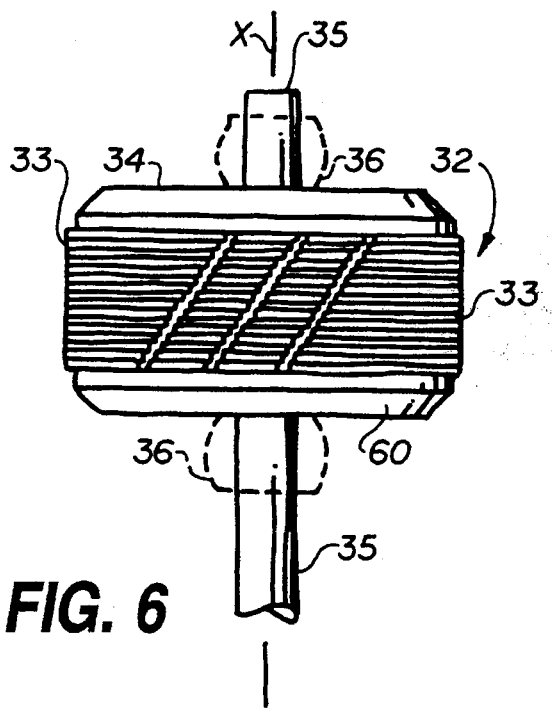
FIG. 6 is a side view illustrating the armature utilized in the subfractional induction motor of the invention.
Figure 10:
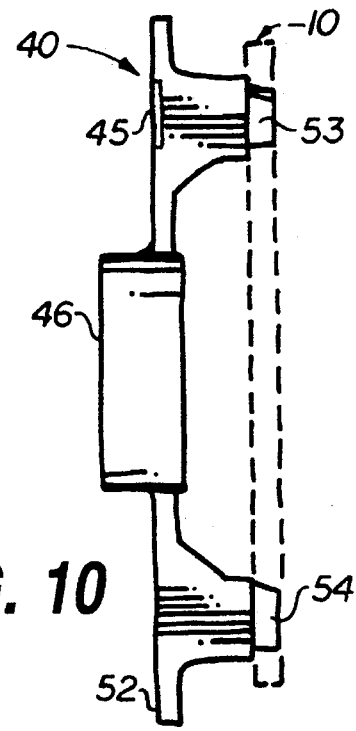
FIG. 10 is a side view illustrating the bracket of FIG. 9.
Figure 11:
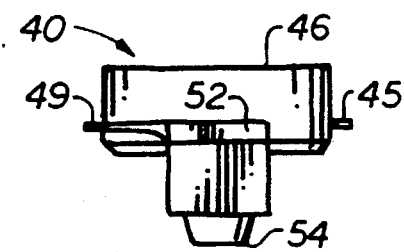
FIG. 11 is a front view illustrating the bracket of FIG. 9.
Figure 12:
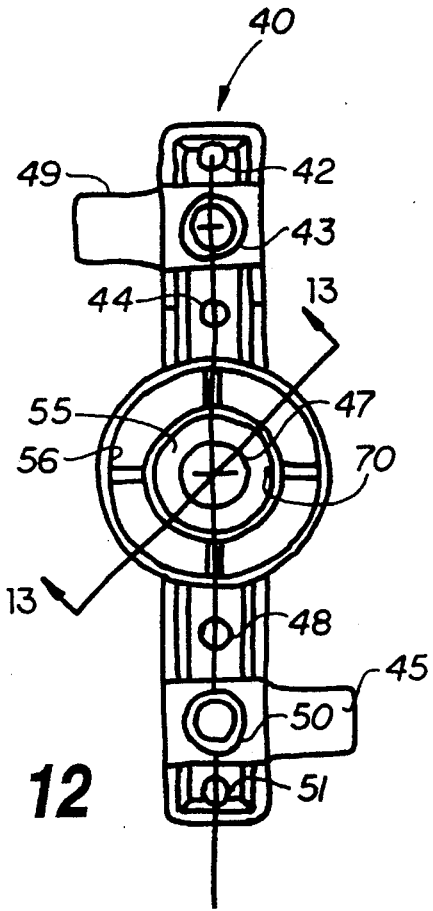
FIG. 12 is a bottom view further illustrating the bracket of FIG. 9.
Figure 13:
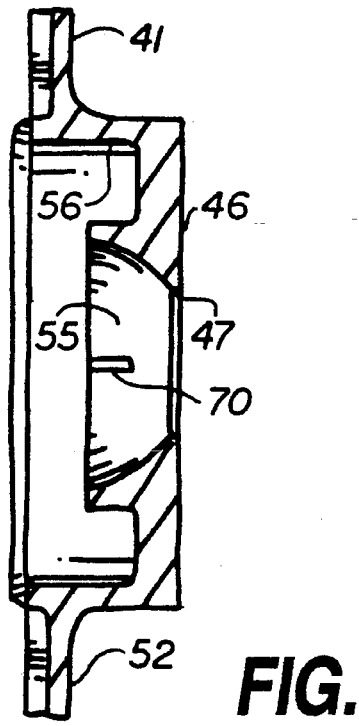
FIG. 13 is a section view further illustrating internal construction details of the bracket of FIG. 12 and taken along section line 13—13 thereof.
Figure 15:
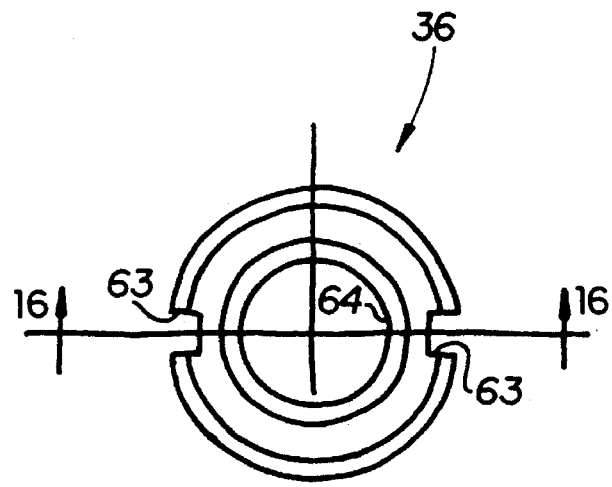
FIG. 15 is a top view illustrating the bearing utilize in the invention.
Figure 14:
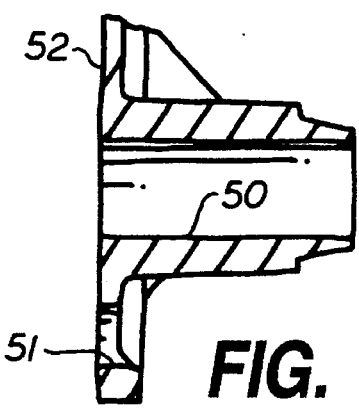
FIG. 14 is a section view further illustrating internal construction details of the bracket of FIG. 9 and taken along section line 14—14 thereof.
Figure 16:
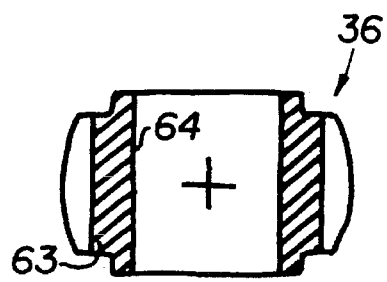
FIG. 16 is a side section view of the bearing of FIG. 15 taken along section line 16—16 and illustrating further construction details thereof.

After the rotor 32 is placed inside the inner stator stack, self aligning porous metal bearings 36 are placed over shaft 35 on the top and bottom of rotor 32 (FIG. 6). A first mounting bracket 40 is then placed over the top surface 34 of rotor 32 such that feet 53 and 54 seat in apertures 38 and 39, respectively, of the lamina 10 on the top of the outer laminate stack (FIG. 10), such that shaft 35 extends upwardly through opening 47, such that bearing 36 on top of rotor 32 seats in semispherical surface 55 (FIGS. 12 and 13) of the bracket 40, and such that elongate cylindrical pin 70 extending outwardly from bracket 40 (FIGS. 12 and 13) extends into a slot 63 of bearing 36 to prevent the rotation of bearing 36. Shaft 35 also extends upwardly through cylindrical opening 64 in bearing 36. A second bracket 40 is then placed over the bottom surface 60 of rotor 32 such that feet 53 and 54 of the second bracket seat in apertures 38 and 39, respectively, of the lamina 10 on the bottom of the outer laminate stack, such that shaft 35 extends downwardly through opening 47 of the second bracket 40, and such that bearing 36 on the bottom of the rotor 32 seat in semispherical surface 55 of the second bracket 40. After the first and second mounting brackets are positioned as described, a first elongate bolt 61 is passed through apertures 43 and 38 and a nut is utilized to tighten the mounting brackets and laminae 10 together. A second elongate bolt 62 is passed through aperture 50 and 39 and a nut is utilized to tighten the mounting brackets and laminae 10 together. The first and second elongate bolts can also, in addition to passing through apertures 43,38 and 50,39, respectively, be long enough to pass through apertures in the housing of an evaporative cooler pump so that the assembled motor can be secured to the pump with nuts. Or, the motor can otherwise be secured to an evaporative cooler pump or to some other structure.

In FIGS. 9 to 13, mounting bracket 40 includes upper flat surface 41; apertures 42 to 44; circular flat surface 46; aperture 47; upper flat surface 52; apertures 48, 50, 51; tabs 45 and 49 to receive ground wire clips; feet 53 and 54; inner cylindrical surface 56 on the bottom of bracket 40; and, semispherical surface 55 on the bottom of bracket 40.

Having described my invention in such terms as to enable those skilled in the art to understand and practice it, and having described the presently preferred embodiments thereof,

I claim:

1. A concentric shaded multiple-pole subfractional horsepower induction motor including
   (a) a stator including
      (i) an outer portion including a plurality of registered laminations each having a selected width and being of substantially equal shape and dimension stacked one on top of the other, said outer portion circumscribing and defining a first inner open space;
      (ii) an inner portion including a plurality of registered laminations each of substantially equal shape and dimension stacked one on top of the other, said inner portion of said stator core circumscribing and defining a second inner open space, and including first and second pole tip portions;
   (b) at least a pair of shaded poles on said inner portion of said stator;
   (c) at least one bobbin on said inner portion of said stator;
   (d) at least first and second pairs of reluctance gaps on said inner portion of said stator, the reluctance gaps each being spaced apart from one of said shaped poles along an arc by 90 degrees or less, each of said first and second pairs of reluctance gaps being formed in a different one of said first and second pole tip portions, the reluctance gaps in each of said pairs being spaced apart along an arc of less than forty degrees;
   (e) a cylindrical armature rotatably mounted in said second inner open space, said armature having a selected diameter, the ratio of said diameter to said width of each of said stator laminations in said outer portion being in the range of 1:2.36 to 1:4.4.

2. The motor of claim 1 wherein said diameter of said armature is in the range of 0.75 to 1.4 inches.

3. The motor of claim 2 wherein the distance along an arc between the reluctance gaps comprising each of said pair of reluctance gaps is in the range of twenty to twenty-two degrees.

4. The motor of claim 3 wherein each of the reluctance gaps opens outwardly from said second inner open space.

5. A water pump for an evaporative cooler, said pump including pump means and a concentric shaded multiple-pole subfractional horsepower induction motor to drive said pump means, said motor including
   (a) a stator including
      (i) an outer portion including a plurality of registered laminations each having a selected width and being of substantially equal shape and dimension stacked one on top of the other, said outer portion circumscribing and defining a first inner open space;
      (ii) an inner portion including a plurality of registered laminations each of substantially equal shape and dimension stacked one on top of the other, said inner portion of said stator core circumscribing and defining a second inner open space, and including first and second pole tip portions;
   (b) at least a pair of shaded poles on said inner portion of said stator;
   (c) at least one bobbin on said inner portion of said stator;
   (d) at least first and second pairs of reluctance gaps on said inner portion of said stator, the reluctance gaps each being spaced apart from one of said shaped poles along an arc by 90 degrees or less, each of said first and second pairs of reluctance gaps being formed in a different one of said first and second pole tip portions, the reluctance gaps in each of said pairs being spaced apart along an arc of less than forty degrees; and,
   (e) a cylindrical armature rotatably mounted in said second inner open space, said armature having a selected diameter, the ratio of said diameter to said width of each of said stator laminations in said outer portion being in the range of 1:2.36 to 1:4.4, said diameter of said armature permitting said armature to be utilized in a C-frame shaded multiple-pole subfractional horsepower induction motor for a water pump for an evaporative cooler.

6. The pump of claim 5 wherein said diameter of said armature in said concentric motor is in the range of 0.75 to 1.4 inches.

7. The pump of claim 6 wherein the distance along an arc between the reluctance gaps comprising each of said pair of reluctance gaps is in the range of twenty to twenty-two degrees.

8. The pump of claim 6 wherein each of the reluctance gaps opens outwardly from said second inner open space.

* * * * *

UNITED STATES PATENT AND TRADEMARK OFFICE
CERTIFICATE OF CORRECTION

| | | |
|---|---|---|
| PATENT NO. | : 5,568,000 C1 | Page 1 of 1 |
| APPLICATION NO. | : 90/011243 | |
| DATED | : March 20, 2012 | |
| INVENTOR(S) | : John B. Hanneken | |

It is certified that error appears in the above-identified patent and that said Letters Patent is hereby corrected as shown below:

Title Page 1, Item number (73), please delete "Norwest Business Credit, Inc., Phoenix, AZ (US)" and insert --Dial Manufacturing, Inc., Phoenix, AZ (US)-- therefore.

Column 2, Claim 5, line 6, please delete "[shaped] shaded" and insert --shaped-- therefore.

Signed and Sealed this
Fourth Day of December, 2012

David J. Kappos
*Director of the United States Patent and Trademark Office*

(12) EX PARTE REEXAMINATION CERTIFICATE (8903rd)
United States Patent
Hanneken

(10) Number: US 5,568,000 C1
(45) Certificate Issued: Mar. 20, 2012

(54) MULTIPLE POLE, SHADED POLE SUBFRACTIONAL-HORSEPOWER INDUCTION MOTOR

(75) Inventor: John B. Hanneken, Tempe, AZ (US)

(73) Assignee: Norwest Business Credit, Inc., Phoenix, AZ (US)

Reexamination Request:
No. 90/011,243, Sep. 19, 2010

Reexamination Certificate for:
Patent No.: 5,568,000
Issued: Oct. 22, 1996
Appl. No.: 08/311,942
Filed: Sep. 26, 1994

(51) Int. Cl.
*H02K 1/14* (2006.01)
*H02K 17/02* (2006.01)
*H02K 17/10* (2006.01)
*H02K 5/04* (2006.01)
*H02K 5/22* (2006.01)
*H02K 5/15* (2006.01)

(52) U.S. Cl. .................... 310/216.102; 310/90
(58) Field of Classification Search .................. 310/254
See application file for complete search history.

(56) References Cited

To view the complete listing of prior art documents cited during the proceeding for Reexamination Control Number 90/011,243, please refer to the USPTO's public Patent Application Information Retrieval (PAIR) system under the Display References tab.

*Primary Examiner* — Anjan K. Deb

(57) ABSTRACT

A multiple pole, shaded pole, subfractional-horsepower induction motor includes a two piece stator. Wound wire is mounted on one piece of the stator before final assembly of the stator. Reluctance gaps are utilized to increase the strength of the motor.

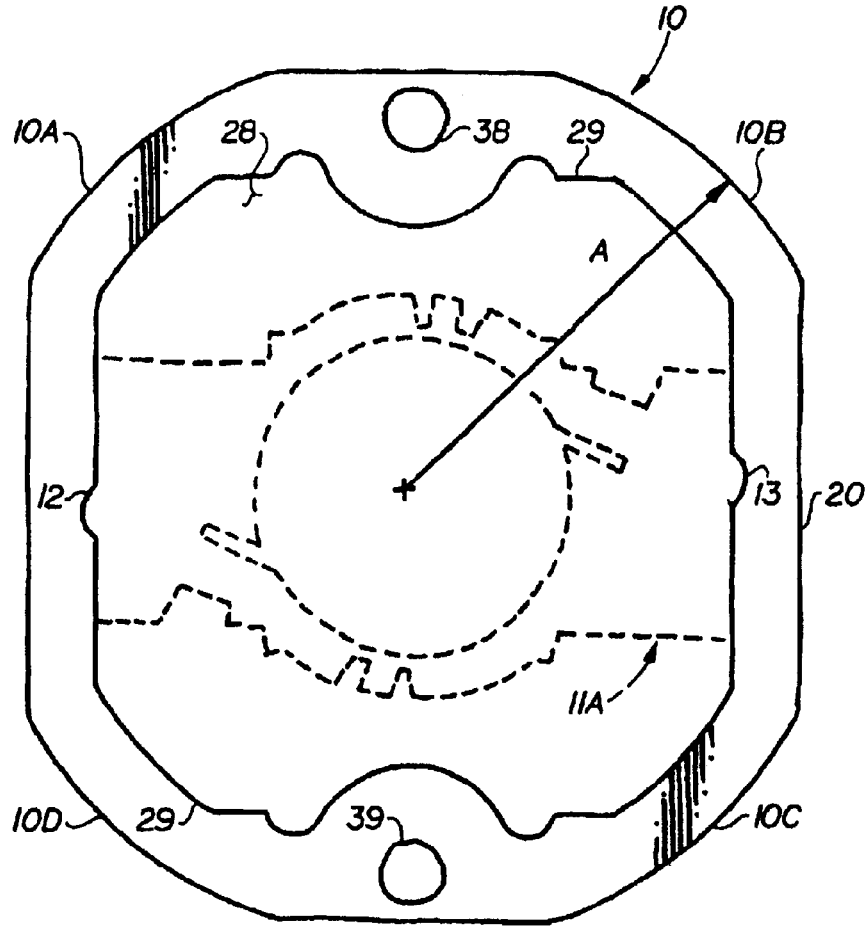

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-4 is confirmed.

Claim 8 is cancelled.

Claim 5 is determined to be patentable as amended.

Claims 6-7, dependent on an amended claim, are determined to be patentable.

New claims 9-14 are added and determined to be patentable.

5. A water pump for an evaporative cooler, said pump including pump means and a concentric shaded multiple-pole subfractional horsepower induction motor to drive said pump means, said motor including (a) a stator including
  (i) an outer portion including a plurality of registered laminations each having a selected width and being of substantially equal shape and dimension stacked one on top of the other, said outer portion circumscribing and defining a first inner open space;
  (ii) an inner portion including a plurality of registered laminations each of substantially equal shape and dimension stacked one on top of the other, said inner portion of said stator core circumscribing and defining a second inner open space, and including first and second pole tip portions;
(b) at least a pair of shaded poles on said inner portion of said stator;
(c) at least one bobbin on said inner portion of said stator;
(d) at least first and second pairs of reluctance gaps on said inner portion of said stator, the reluctance gaps each *opening outwardly from said second inner open space and each* being spaced apart from one of said [shaped] *shaded* poles along an arc by 90 degrees or less, each of said first and second pairs of reluctance gaps being formed in a different one of said first and second pole tip portions, the reluctance gaps in each of said pairs being spaced apart along an arc of less than forty degrees; and,
(e) a cylindrical armature rotatably mounted in said second inner open space, said armature having a selected diameter, the ratio of said diameter to said width of each of said stator laminations in said outer portion being in the range of 1:2.36 to 1:4.4, said diamter of said armature permitting said armature to be utilized in a C-frame shaded multiple-pole subfractional horsepower induction motor for a water pump for an evaporative cooler.

*9. The motor of claim 1, wherein said inner portion of said stator is configured such that said second inner open space can be divided into quadrants, wherein:*
  *(i) said first pair of reluctance gaps and a first one of said pair of shaded poles lie within a first one of said quadrants; and*
  *(ii) said second pair of reluctance gaps and a second one of said pair of shaded poles lie in a second one of said quadrants.*

*10. The motor of claim 9, wherein said first one of said quadrants is opposite to said second one of said quadrants.*

*11. The motor of claim 1, wherein said width of each of said of said stator laminations in said outer portion is about 3.3 inches.*

*12. The motor of claim 5, wherein said inner portion of said stator is configured such that said second inner open space can be divided into quadrants wherein:*
  *(i) said first pair of reluctance gaps and a first one of said pair of shaded poles lie in a first one of said quadrants; and*
  *(ii) said second pair of reluctance gaps and a second one of said pair of shaded poles lie in a second one of said quadrants.*

*13. The motor of claim 12, wherein said first one of said quadrants is opposite to said second one of said quadrants.*

*14. The motor of claim 5, wherein said width of each of said of said stator laminations in said outer portion is about 3.3 inches.*

* * * * *